United States Patent [19]
Hirata et al.

[11] Patent Number: 5,263,385
[45] Date of Patent: Nov. 23, 1993

[54] SPEED CONTROL SYSTEM FOR A WORKING VEHICLE HAVING A STEPLESS TRANSMISSION

[75] Inventors: Kazuo Hirata; Seiichi Ishiizumi, both of Sakai, Japan

[73] Assignee: Kubota Corporation, Osaka, Japan

[21] Appl. No.: 887,206

[22] Filed: May 21, 1992

[30] Foreign Application Priority Data

Dec. 10, 1991 [JP] Japan .................. 3-325461

[51] Int. Cl.⁵ .................. G05G 11/00; G05G 1/14
[52] U.S. Cl. .................. 74/481; 74/474; 188/378
[58] Field of Search .................. 74/474, 481, 482; 188/378

[56] References Cited

U.S. PATENT DOCUMENTS

| | | | |
|---|---|---|---|
| 3,537,328 | 11/1970 | Allen | 74/481 |
| 4,341,129 | 7/1982 | Bando | 74/481 |
| 4,507,980 | 4/1985 | Nishiyama et al. | 188/378 X |
| 4,608,879 | 9/1986 | Ishida et al. | 74/474 |
| 4,620,575 | 11/1986 | Cuba et al. | 74/482 X |
| 5,020,644 | 6/1991 | Novoa | 188/378 |

FOREIGN PATENT DOCUMENTS 2467098 4/1981 France .
2-102832 4/1990 Japan .

*Primary Examiner*—Allan D. Herrmann
*Attorney, Agent, or Firm*—Jordan and Hamburg

[57] ABSTRACT

A speed control system for a working vehicle having a stepless transmission with a speed control shaft disposed on one side thereof and shiftable between a driving region and a neutral position. This speed control system includes a shift lever disposed on one side of a driver's section for setting a traveling speed of the tractor, while the speed control shaft of the stepless transmission is disposed on the other side of the driver's section. The shift lever is operatively connected to the speed control shaft through a link mechanism. The link mechanism includes a neutralizing mechanism in an intermediate position thereof adjacent the shift lever for returning the speed control shaft to the neutral position.

5 Claims, 4 Drawing Sheets

SPEED CONTROL SYSTEM FOR A WORKING VEHICLE HAVING A STEPLESS TRANSMISSION

BACKGROUND OF THE INVENTION

1. Field of the Invention

This invention relates to a speed control system for a working vehicle including a stepless transmission, e.g. a hydrostatic stepless transmission, in a propelling system, the transmission being operable to provide varied speeds by pivotal movement of a shift lever.

2. Description of the Related Art

A conventional speed control system as noted above is disclosed in U.S. Pat. No. 4,341,129 or Japanese Patent Publication Kokai No. 2-102832, for example. In the conventional system, a hydrostatic stepless transmission has a speed control shaft urged to return to a neutral position by a neutralizing mechanism. The neutralizing mechanism includes a control arm fixed to the speed control shaft to be rotatable in unison therewith and defining a V-shaped recess to act as a cam. A spring-loaded cam follower is pressed on the cam to urge the control arm, and thus the speed control shaft, to return to the neutral position.

In the conventional structure, the neutralizing cam is directly connected to the speed control shaft as noted above. Consequently, where the neutral position is deviated due to an assembly error, an operation to adjust the neutral position is difficult.

Further, efforts have been made in recent years to improve driving environment by providing not only a vibration damping structure for the engine but also a damping support for mounting the hydrostatic stepless transmission on the vehicle body frame. However, in spite of the damping support for the hydrostatic stepless transmission, vibrations are transmitted from the speed control shaft through an interlocking mechanism connecting the speed control shaft to the shift lever. It is important to prevent this. For this purpose, a damping element may be mounted in an intermediate position of the interlocking mechanism. A maximum damping effect will be produced with the speed control shaft. However, since this shaft has the neutralizing mechanism requiring precision, some other position must be selected for incorporating the damping element. Thus, a sufficient damping effect cannot be expected.

SUMMARY OF THE INVENTION

The object of the present invention is to provide a speed control system for a working vehicle including a stepless transmission with a speed control shaft disposed on one side thereof and shiftable between a driving region and a neutral position, the speed control system securing a free space adjacent the speed control shaft to serve the purpose such as of taking vibration damping measures.

The above object is fulfilled, according to the present invention, by a speed control system in which neutralizing means for urging the speed control shaft to the neutral position is disposed in a region remote from the speed control shaft, the neutralizing means being connected for shift transmission to the speed control shaft through connecting means.

According to this construction, the neutralizing means is provided in an intermediate position of a connecting mechanism connecting the speed control shaft to a shift lever acting as speed setting means. Consequently, a free space is formed adjacent the speed control shaft, while allowing selection of an ample space intermediate the connecting mechanism for installing the neutralizing means. This facilitates an adjusting operation. It is also possible to allow a relatively large vibration damping element to be installed with ease in the vicinity of the speed control shaft which is best suited for damping purposes.

Other features and advantages of the present invention will be apparent from the following description of the preferred embodiment taken with reference to the accompanying drawings.

DETAILED DESCRIPTION OF THE PREFERRED EMBODIMENT

An embodiment of the present invention will be described with reference to the drawings.

Figure 1:
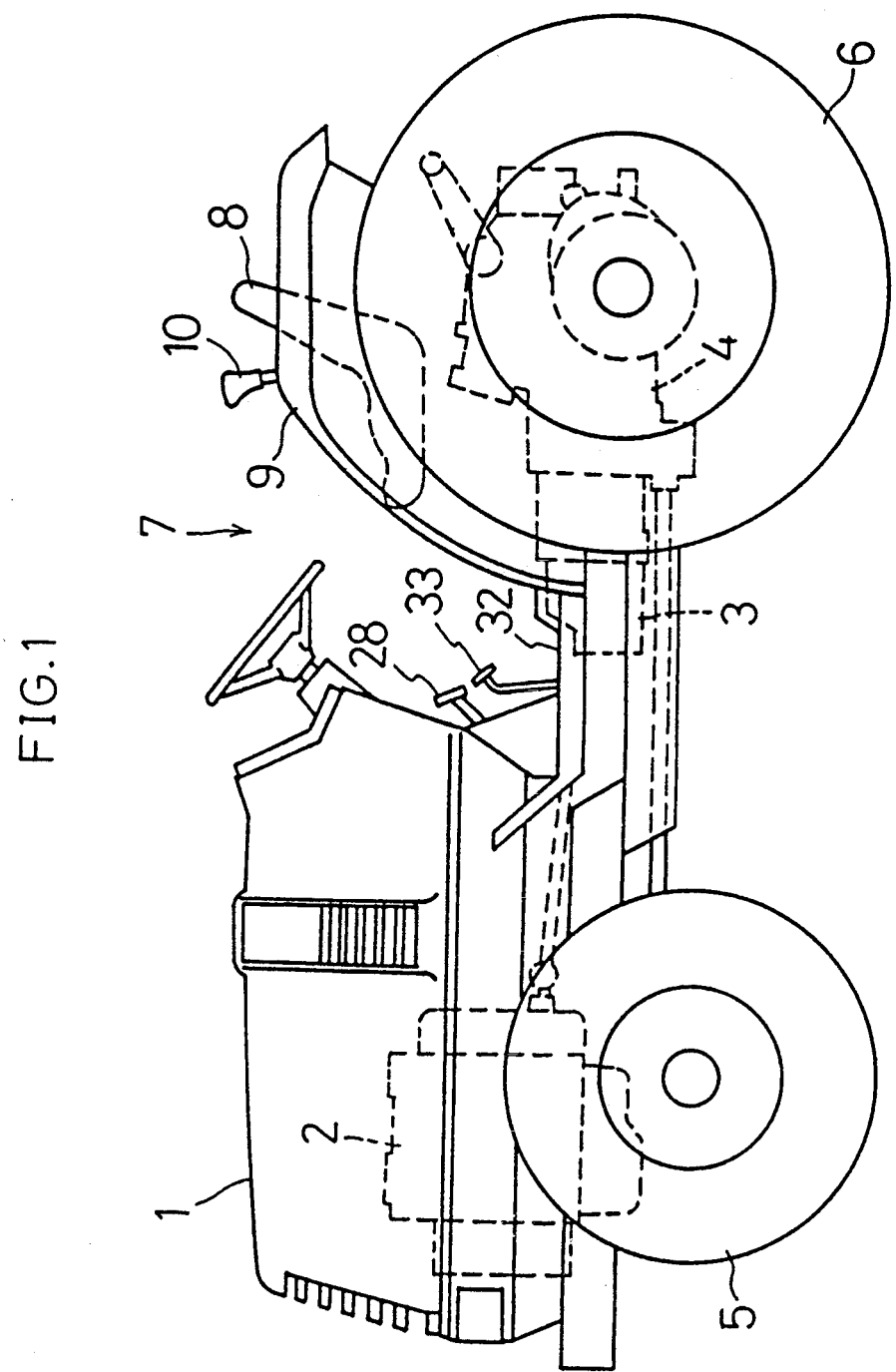
FIG. 1 is a side elevation of a tractor employing a speed control system according to the present invention.

FIG. 1 shows an agricultural tractor. This tractor has an engine 2 mounted in a hood 1 disposed on a front position of a tractor body. Drive of the engine 2 is transmitted to a hydrostatic stepless transmission 3 and a transmission case 4 for driving front wheels 5 and rear wheels 6. The hydrostatic stepless transmission 3 is controllable by a shift lever 10 projecting upward through a rear fender 9 disposed to a left side of a driver's seat 8 in a driver's section 7, and by a change speed pedal 33 disposed on a right side of a floor 32 of the driver's section 7.

Figure 2:
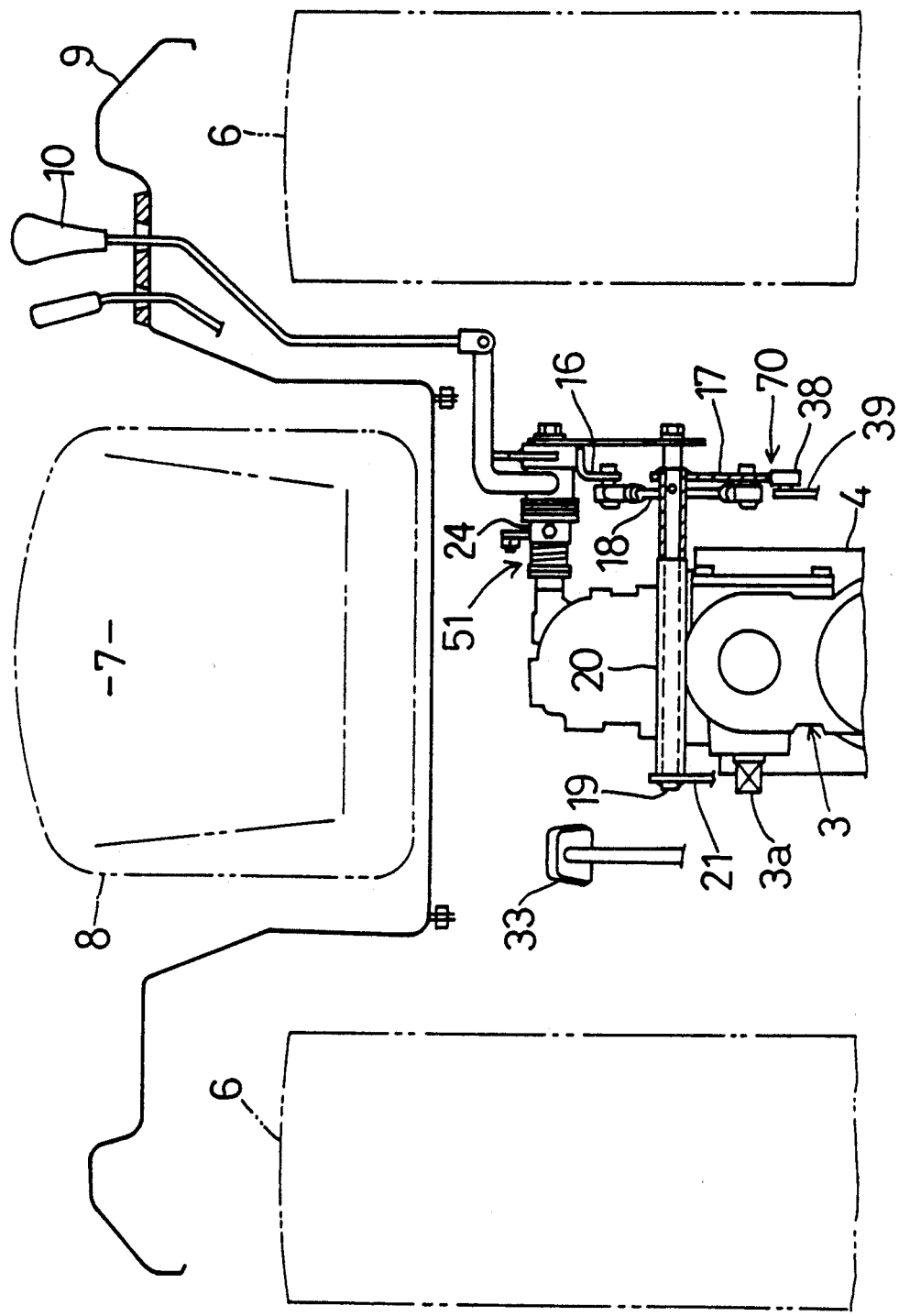
FIG. 2 is a front view showing an outline of the speed control system.

A change speed control structure will particularly be described with reference to FIGS. 2 and 3. The hydrostatic stepless transmission 3 has a speed control shaft 3a projecting rightward therefrom. A vibration damping ring 11 having a large mass is mounted on the speed control shaft 3a to be rotatable therewith. A control arm 12 is attached to a peripheral position of the vibration damping ring 11. The control arm 12 is connected to a neutralizing mechanism 70 through an interlocking device 60. The neutralizing mechanism 70 is connected to the shift lever 10 through a shift transmitting mechanism 50. As shown in FIG. 2, the shift transmitting mechanism 50 includes a frictional position retaining device 51 disposed in a lefthand position above the transmission case 4. The position retaining device 51 includes a support shaft 13 extending laterally outwardly from an upper position of the transmission case 4. The support shaft 13 has a hollow shaft 14 mounted thereon for relatively rotatably supporting a proximal boss 15 of the shift lever 10. As seen from FIG. 4, a control arm assembly 16 is rotatably mounted on the proximal boss 15. The arm assembly 16 includes two arms one of which extends to a position to contact the shift lever 10 bent substantially 90 degrees, whereby the arm assembly 16 is turned with an operation of the shift lever 10 in a forward drive accelerating direction from a neutral position. The other arm of the arm assembly 16 is operatively connected through a push-pull rod 18 to a relaying swing arm 17 forming part of the neutralizing mechanism 70. The relaying swing arm 17 is rotatable with a relaying rotary shaft 19. To transmit rotation to the interlocking device 60, the relaying rotary shaft 19 extends transversely of the tractor body from one side to the other side of the stepless transmission 3 through a boss 20 fixedly mounted above the stepless transmission 3. The relaying rotary shaft 19 carries an arm 21 fixed to the other end thereof, i.e. the righthand end transversely of the tractor body. The arm 21 is pivotally connected through a push-pull rod 22 to the control arm 12 fixed to the vibration damping ring 11.

Figure 4:
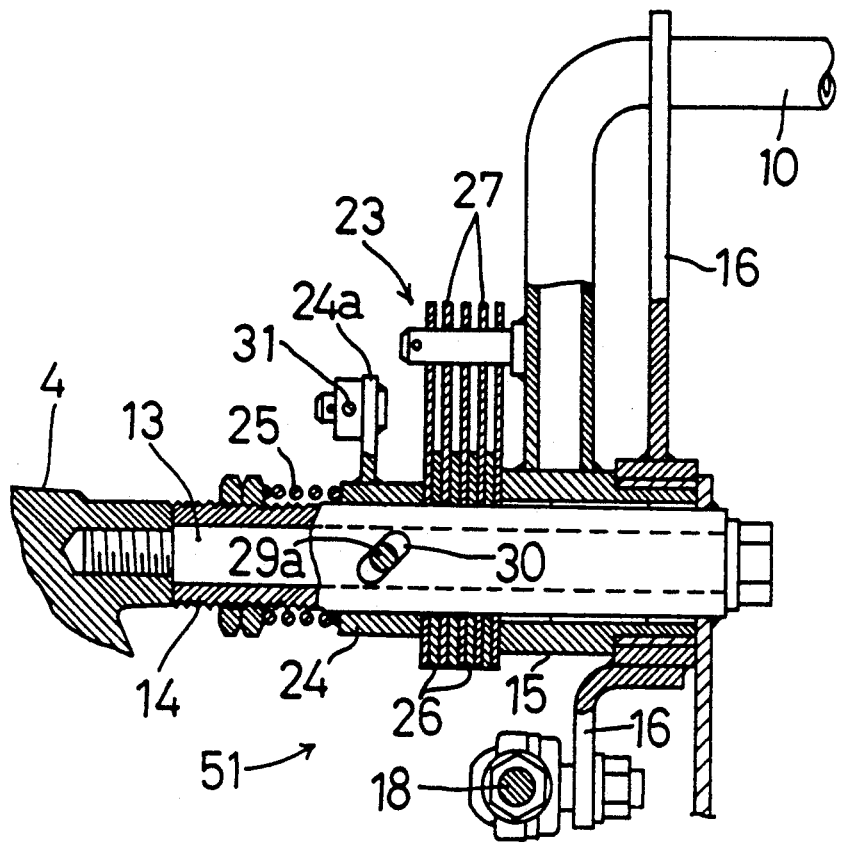
FIG. 4 is a front view, partly in section, of a frictional retaining mechanism.

When the driver releases the shift lever 10 halfway in a shifting operation, the frictional retaining mechanism 51 retains the shift lever 10 in the halfway position. As shown in FIG. 4, a multidisk friction mechanism 23 is slidably mounted on the support shaft 13 on which the proximal boss 15 of the shift lever 10 is also mounted. This friction mechanism 23 is pressed by a coil spring 25 through a sleeve 24. The friction mechanism 23 includes a plurality of stationary friction disks 26 fixed to the transmission case 4, and a plurality of movable friction disks 27 rotatable with operation of the shift lever 10. The stationary disks 26 and movable disks 27 are arranged alternately. Thus, the shift lever 10 is frictionally retainable in a selected speed position by the pressing force of the coil spring 25.

Figure 5:
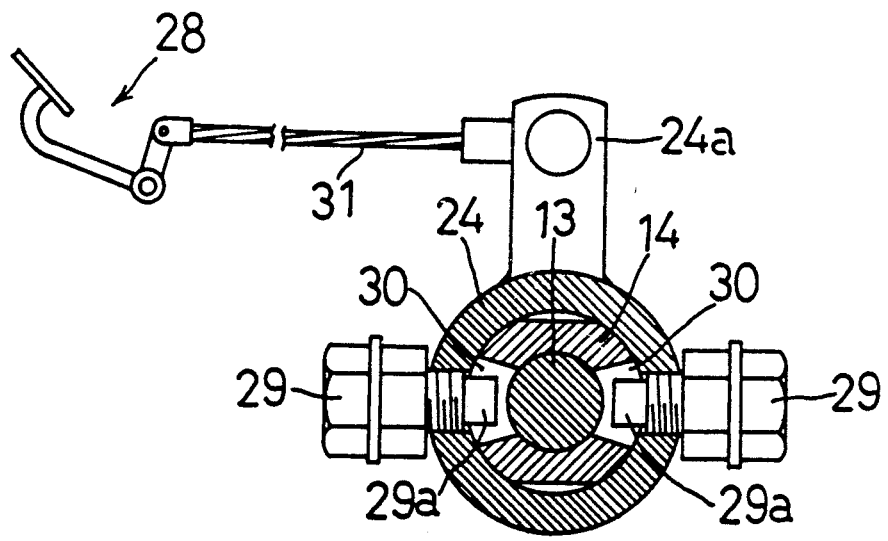
FIG. 5 is a side view, partly in section, of a friction canceling mechanism.

The frictional retaining mechanism 51 is operable by depression of a brake pedal 28 to cancel the frictional retaining function. Specifically, as shown in FIG. 5, a pair of shoulder bolts 29 are screwed radially inwardly of the sleeve 24, with tubular forward ends 29a thereof extending into engaging grooves 30 formed in oblique directions in the hollow shaft 14. The sleeve 24 has an arm 24a formed thereon, which is interlocked to the brake pedal 28 through a control wire 31. Thus, the sleeve 24 is rotatable upon depression of the brake pedal 28, which, through the engagement between the tubular forward ends 29a of the bolts 29 and the engaging grooves 30, causes the sleeve 24 to slide toward the coil spring 25 against its urging force. This cancels the frictional retaining action of the multidisk friction mechanism 23.

The change speed pedal 33 has a rotatable boss 34 with an arm 35 rigidly connected thereto. The arm 35 is pivotally connected through a link 36 to the control arm 12. The change speed pedal 33 has a front tread 33a and a rear tread 33b for selective depression to provide varied forward and backward speeds.

That is, a change pedal device 80 is foot-operated by the driver in selecting a desired running speed of the tractor, whereas the shift lever 10 is used as a device for setting a constant running speed, i.e. a cruising speed, of the tractor.

The neutralizing mechanism 70, the entirety of which is shown in FIG. 2, is disposed in a space provided laterally of the stepless transmission 3 on the side remote from where the speed control shaft 3a is disposed, i.e. on the righthand side of the stepless transmission 3. The neutralizing mechanism 70 acts to urge the speed control shaft 3a back to a neutral position. The relaying swing arm 17 is in the form of an approximately sector-shaped plate with a centrally recessed cam surface 37 defined on an outer free end edge thereof. This cam surface 37 contacts and guides a cam roller 38 supported by an oscillatable member 39. A coil spring 40 acts on the oscillatable member 39 to press the cam roller 38 against the cam surface 37. Thus, the cam roller 38 applies an urging force to return the relaying swing arm 17 to the neutral position. A hydraulic damper mechanism 41 is provided to prevent a sudden change speed action of the relaying swing arm 17. The relaying swing arm 17 and oscillatable member 39 are both in plate form and in upstanding posture. Thus, the principal components of the neutralizing mechanism 70 may easily be arranged in the space laterally of the stepless transmission 3.

According to the present invention, as described above, the neutralizing mechanism 70 is disposed between the interlocking device 60 and shift lever 10. Positional adjustment between the speed control shaft 3a and neutralizing mechanism 70 and between the neutralizing mechanism 70 and shift lever 10 may be effected with ease by employing the intermediate push-pull rods of the turn-buckle type. Furthermore, a vacant space is secured adjacent the speed control shaft 3a for accommodating the large damping element 11.

The following are the operation modes of the present invention.

When the shift lever 10 is shifted to the OFF-position and then the change speed pedal 33 is depressed by the driver, the displacement of the change speed pedal 33 is transmitted through the link mechanism including the link 36 and the arm 35 to the speed change control shaft 3a of the hydrostatic stepless transmission (HST) 3. Thus, desired running speed of the tractor is achieved. While adjusting the desired running speed by varying the position of the change speed pedal 33, if the change speed pedal 33 is released by the driver, the change speed shaft 3a is rotationally biased to the speed reducing direction by the neutralizing mechanism 70 through the interlocking device 60. Note, that in this operation mode, the operative connection between the shift lever 10 used for cruising run and the shift pedal 33 is terminated; therefore, the rotational displacement of the speed control shaft 3a due to the depressing action of the shift pedal 33 is not transmitted to the shift lever 10.

Figure 3:
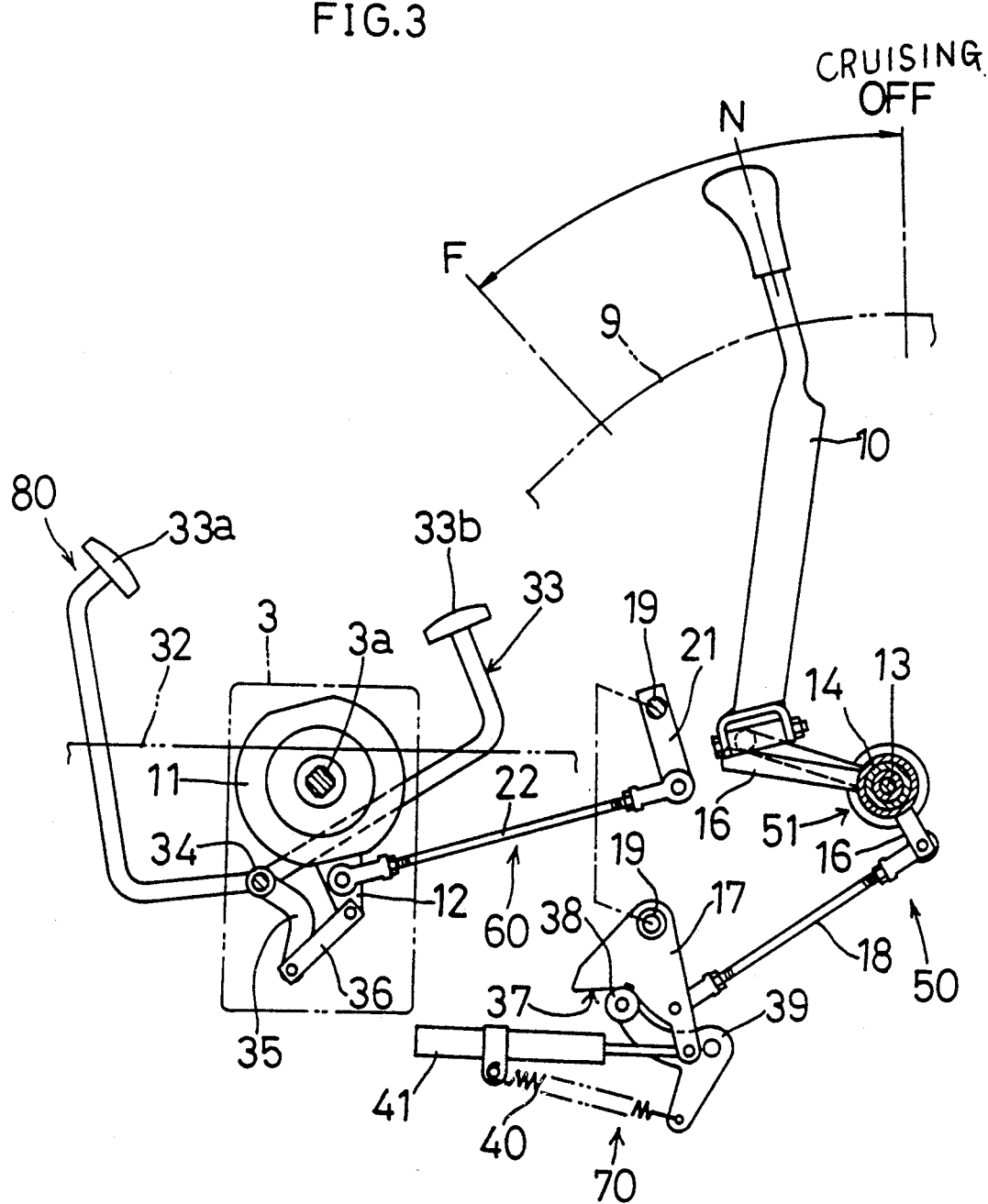
FIG. 3 is a schematic side view of the speed control system.

When the shift lever 10 is initially shifted to the N-position, as shown in FIG. 3, and then the change speed pedal 33 is depressed, the displacement of the change speed pedal 33 is transmitted through the link mechanism to the speed change control shaft 3a and is further transmitted to the shift lever 10 through the interlocking device 60, the swing arm 17, and via the shift transmitting mechanism 50. The shifted position of the shift lever 10 from its initial N-position is maintained by the friction position retaining device 51. Thus, even if the driver's foot on the change speed pedal 33 is released, the running speed of the tractor once set by the driver will be maintained. However, if the brake pedal 28 is depressed during this cruising run, the frictional retaining function of the retaining device 51 is cancelled.

In addition, as previously described, the desired running speed of the tractor can also be set by the shifting operation of the shift lever 10 when the lever is positioned anywhere between the N-position and the F-position. In this case, the position of the shift lever 10 arbitrarily set by the driver, is maintained by the friction position retaining device 51 as in the above-mentioned mode.

What is claimed is:

1. A speed control system for a working vehicle having a stepless transmission with a speed control shaft disposed on one side thereof, said speed control shaft being capable of being shifted between a driving region and a neutral position, said speed control system comprising:

neutralizing means disposed in a region remote from said speed control shaft for urging said speed control shaft to the neutral position, said neutralizing means being disposed opposite said speed control shaft across said stepless transmission, connecting means for interconnecting said speed control shaft and said neutralizing means to enable shift transmission between said control shaft and said neutralizing means, said connecting means including a rotary shaft extending over said stepless transmission;

speed setting means for setting a ground running speed of said working vehicle;

shift transmitting means for interconnecting said speed setting means and said neutralizing means to enable shift transmission;

a link mechanism for interlocking said rotary shaft and said speed control shaft;

and said speed control shaft including a vibration damping ring having a large mass, said link mechanism being connected to said vibration damping ring.

2. A speed control system as claimed in claim 1, wherein said neutralizing means includes:

a cam member having one end thereof pivotally connected to said rotary shaft, and the other end defining a V-shaped cutout, said cam member being connected to said shift transmitting means;

a displaceable cam follower having a roller for contacting said V-shaped cutout; and a spring for biasing said roller against said V-shaped cutout;

said speed control shaft being in the neutral position when said roller lies in said V-shaped cutout.

3. A speed control system for a working vehicle having a stepless transmission with a speed control shaft disposed on one side thereof, said speed control shaft being capable of being shifted between a driving region and a neutral position, said speed control system comprising:

neutralizing means disposed in a region remote from said speed control shaft for urging said speed control shaft to the neutral position;

connecting means for interconnecting said speed control shaft and said neutralizing means to enable shift transmission between said speed control shaft and said neutralizing means;

speed setting means for setting a ground running speed of said working vehicle;

shift transmitting means for interconnecting said speed setting means and said neutralizing means to enable shift transmission;

pedal means for controlling said speed control shaft, and including a seesaw type pedal, and a pedal link mechanism for transmitting displacement of said pedal to said speed control shaft;

said speed control shaft including a vibration damping ring having a large mass, and said connecting means and said pedal link mechanism being connected to said vibration damping ring.

4. A speed control system for a working vehicle having a stepless transmission with a speed control shaft disposed on one side thereof, said speed control shaft being capable of being shifted between a driving region and a neutral position, said speed control system comprising:

neutralizing means disposed in a region remote from said speed control shaft for urging said speed control shaft to the neutral position;

connecting means for interconnecting said speed control shaft and said neutralizing means to enable shift transmission between said speed control shaft and said neutralizing means;

speed setting means for setting a ground running speed of said working vehicle;

shift transmitting means for interconnecting said speed setting means and said neutralizing means to enable shift transmission; and a vibration damping means, said vibration damping means being fixed to said speed control shaft.

5. A speed control system as claimed in claim 4, wherein said neutralizing means is disposed opposite said speed control shaft across said stepless transmission, said connecting means including a rotary shaft extending over said stepless transmission, a link mechanism for interlocking said rotary shaft and said speed control shaft, and said link mechanism being connected to said vibration damping means.

* * * * *